(12) United States Patent
Suzuki

(10) Patent No.: US 11,293,524 B2
(45) Date of Patent: Apr. 5, 2022

(54) VEHICLE DRIVE DEVICE

(71) Applicant: JTEKT CORPORATION, Osaka (JP)

(72) Inventor: Yoshinori Suzuki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/066,878

(22) Filed: Oct. 9, 2020

(65) Prior Publication Data

US 2021/0108706 A1  Apr. 15, 2021

(30) Foreign Application Priority Data

Oct. 15, 2019 (JP) .............................. JP2019-188759

(51) Int. Cl.

| | |
|---|---|
| *F16H 1/06* | (2006.01) |
| *F16H 1/20* | (2006.01) |
| *F16H 1/22* | (2006.01) |
| *F16H 55/17* | (2006.01) |
| *B60K 1/00* | (2006.01) |
| *F16H 57/037* | (2012.01) |
| *B60K 17/04* | (2006.01) |
| *F16H 57/022* | (2012.01) |
| *F16H 57/02* | (2012.01) |

(52) U.S. Cl.
CPC .............. *F16H 1/22* (2013.01); *F16H 1/206* (2013.01); *F16H 55/17* (2013.01); *B60K 1/00* (2013.01); *B60K 17/04* (2013.01); *B60K 2001/001* (2013.01); *F16H 57/022* (2013.01); *F16H 57/037* (2013.01); *F16H 2057/0221* (2013.01); *F16H 2057/02052* (2013.01); *F16H 2702/02* (2013.01)

(58) Field of Classification Search
CPC ... F16H 1/08; F16H 55/17; F16H 1/22; F16H 1/206
See application file for complete search history.

(56) References Cited

U.S. PATENT DOCUMENTS

| | | | | |
|---|---|---|---|---|
| 2,982,146 | A | * | 5/1961 | Stoeckicht ................ F16H 1/08 74/466 |
| 4,612,816 | A | * | 9/1986 | Chalik .................... F16H 55/18 74/401 |
| 4,641,543 | A | * | 2/1987 | Jessup ..................... F16H 1/206 74/410 |

(Continued)

FOREIGN PATENT DOCUMENTS

| | | | |
|---|---|---|---|
| FR | 1542110 A | * | 10/1968 |
| JP | 2019-95007 A | | 6/2019 |

*Primary Examiner* — Jake Cook
(74) *Attorney, Agent, or Firm* — Oblon, McClelland, Maier & Neustadt, L.L.P.

(57) ABSTRACT

A vehicle drive device includes: an input shaft that receives a driving force of a driving source and that is provided with a first gear; an intermediate shaft that is provided with a second gear meshing with the first gear and a third gear located next to the second gear in a direction of a rotation axis and that is disposed in such a manner that the intermediate shaft is allowed to move in the direction of the rotation axis; an output shaft that is provided with a fourth gear meshing with the third gear; a first gear pair including the first and second gears; and a second gear pair including the third and fourth gears. One of the first gear pair and the second gear pair includes a helical gear, and the other of the first gear pair and the second gear pair includes a double helical gear.

3 Claims, 8 Drawing Sheets

(56) References Cited

U.S. PATENT DOCUMENTS

| | | | |
|---|---|---|---|
| 6,189,397 B1 * | 2/2001 | Morrow | F16H 3/095 74/331 |
| 2019/0162289 A1 | 5/2019 | Matsumoto | |

* cited by examiner

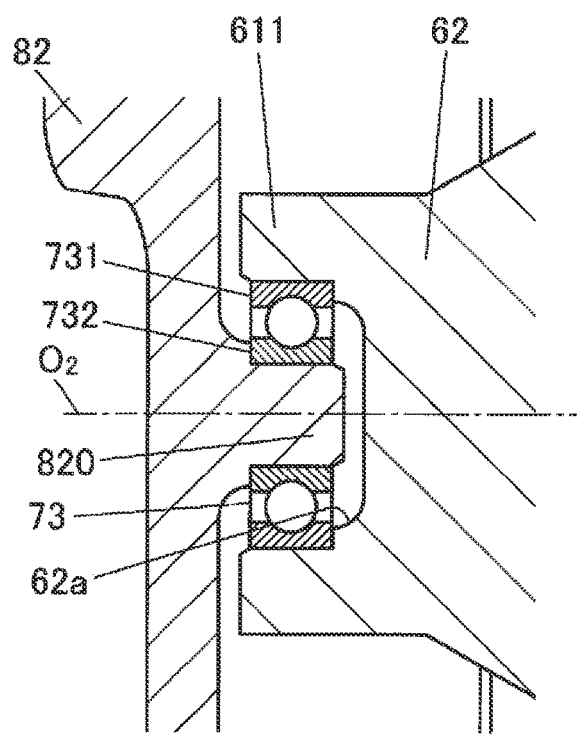
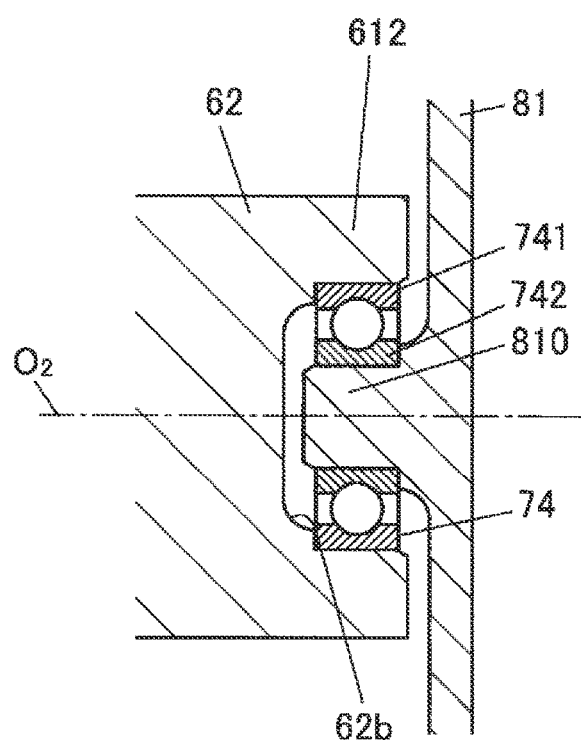
FIG. 3A
FIG. 3B

VEHICLE DRIVE DEVICE

CROSS-REFERENCE TO RELATED APPLICATION

This application claims priority to Japanese Patent Application No. 2019-188759 filed on Oct. 15, 2019, incorporated herein by reference in its entirety.

BACKGROUND

1. Technical Field

The disclosure relates to vehicle drive devices.

2. Description of Related Art

A vehicle drive device that transfers torque increased by reducing the speed of rotation of a motor toward the wheels is conventionally known in the art (see, e.g., Japanese Unexamined Patent Application Publication No. 2019-095007 (JP 2019-095007 A).

The vehicle drive device described in JP 2019-095007 A includes a first shaft, a second shaft, and a third shaft. The first shaft has a first double helical gear and is rotationally driven by the motor. The second shaft has a second double helical gear and a third double helical gear which are located next to each other in the axial direction, and the second double helical gear meshes the first double helical gear. The third shaft has a fourth double helical gear meshing with the third double helical gear and is coupled to the wheel side. Due to the meshing of the first to fourth double helical gears, the speed of rotation of the motor is reduced and the increased torque is transferred toward the wheels.

SUMMARY

In order to manufacture a single double helical gear, it is necessary to produce two helical gears of different hands. Manufacturing cost therefore tends to be relatively high. In the vehicle drive device described in JP 2019-095007 A, all of the gears on the first to third shafts are double helical gears. This is a bottleneck for reduction in manufacturing cost.

The disclosure provides a vehicle drive device capable of achieving reduction in manufacturing cost.

A vehicle drive device according to a first aspect of the disclosure includes: an input shaft that receives a driving force of a driving source and that is provided with a first gear; an intermediate shaft that is provided with a second gear meshing with the first gear and a third gear located next to the second gear in a direction of a rotation axis, and that is disposed in such a manner that the intermediate shaft is allowed to move in the direction of the rotation axis; an output shaft that is provided with a fourth gear meshing with the third gear; a first gear pair including the first gear and the second gear; and a second gear pair including the third gear and the fourth gear. One of the first gear pair and the second gear pair includes a helical gear, and the other of the first gear pair and the second gear pair includes a double helical gear. The double helical gear includes a first meshing portion and a second meshing portion that are located next to each other in the direction of the rotation axis of the intermediate shaft and that have meshing teeth of different hands.

The above configuration achieves reduction in manufacturing cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIGS. 3A and 3B are enlarged views of ball bearings supporting an intermediate shaft and portions around the ball bearings;

DETAILED DESCRIPTION OF EMBODIMENTS

Embodiment

An embodiment of the disclosure will be described with reference to FIGS. 1 to 7. The embodiment described below is illustrated as a specific example suitable for carrying out the disclosure and specifically illustrates various technically preferable technical matters. However, the technical scope of the disclosure is not limited to this specific aspect.

Figure 1:
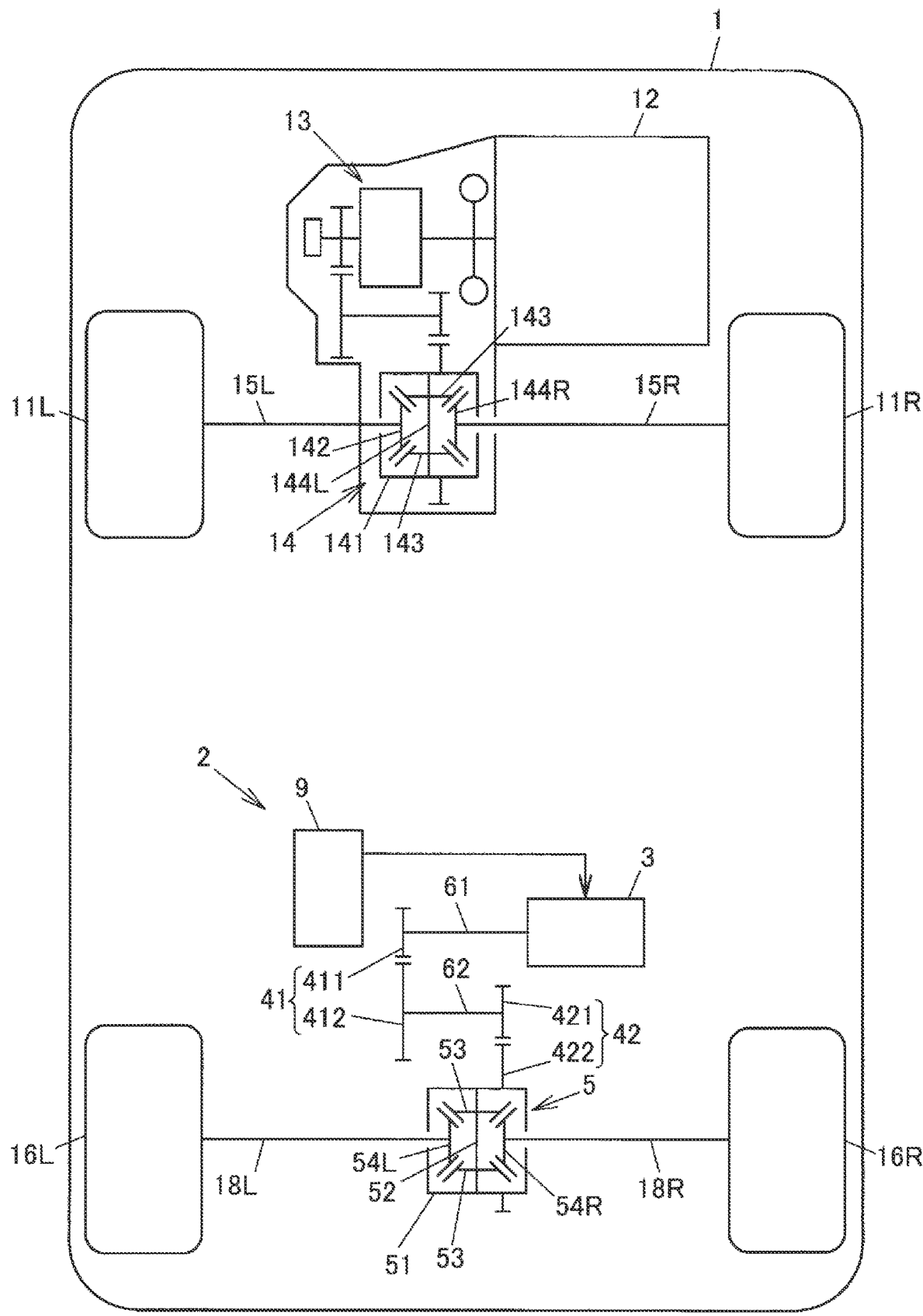
FIG. 1 illustrates a configuration example of a four-wheel drive vehicle equipped with an auxiliary drive device according to an embodiment.

FIG. 1 illustrates a configuration example of a four-wheel drive vehicle equipped with an auxiliary drive device according to the embodiment of the disclosure. In this four-wheel drive vehicle 1, right and left front wheels 11R, 11L are driven by an engine 12 that is a main driving source, and right and left rear wheels 16R, 16L are driven by an auxiliary drive device 2 having an electric motor 3. In the present embodiment, the right and left front wheels 11R, 11L are main drive wheels, and the right and left rear wheels 16R, 16L are auxiliary drive wheels. Hereinafter, "right" and "left" refer to right and left in the lateral direction of the four-wheel drive vehicle 1. The auxiliary drive device 2 corresponds to the vehicle drive device of the disclosure.

As shown in FIG. 1, the driving force of the engine 12 is shifted by a transmission 13 and transmitted to a differential case 141 of a front differential 14. The front differential 14 has the differential case 141, a pinion shaft 142, a pair of pinion gears 143, and a pair of side gears 144R, 144L. The pinion shaft 142 has its both ends supported by the differential case 141. The pinion gears 143 are supported by the pinion shaft 142. The side gears 144R, 144L mesh with the pinion gears 143 with the axes of the side gears 144R, 144L being perpendicular to the axes of the pinion gears 143.

Of the side gears 144R, 144L, a drive shaft 15R is coupled to the right side gear 144R such that the drive shaft 15R is not rotatable relative to the right side gear 144R, and a drive shaft 15L is coupled to the left side gear 144L such that the drive shaft 15L is not rotatable relative to the left side gear 144L. The drive shaft 15R transmits the driving force to the right front wheel 11R, and the drive shaft 15L transmits the driving force to the left front wheel 11L.

The auxiliary drive device 2 has the electric motor 3 that is a driving source, a reduction gear mechanism 4, a differential unit 5, and a control device 9. The reduction gear mechanism 4 reduces the speed of rotation of the electric motor 3. The differential unit 5 distributes the driving force to right and left drive shafts 18R, 18L that are a pair of drive shafts and allows the rear wheels 16R, 16L to rotate at different speeds. The control device 9 is configured to control the electric motor 3.

The differential unit 5 includes a differential case 51, a pinion shaft 52, a plurality of pinion gears 53, and a pair of side gears 54R, 54L. The differential case 51 is rotated by the driving force of the electric motor 3. The pinion shaft 52 has its both ends supported by the differential case 51. The pinion gears 53 are supported by the pinion shaft 52 and rotate with the differential case 51. The side gears 54R, 54L mesh with the pinion gears 53.

In the present embodiment, the single pinion shaft 52 is supported by the differential case 51, and the pair of pinion gears 53 is supported by the single pinion shaft 52. The pair of side gears 54R, 54L meshes with the pair of pinion gears 53 with the axes of the side gears 54R, 54L being perpendicular to the axes of the pinion gears 53. The number of pinion shafts 52 and the number of pinion gears 53 are not limited to this, and the pair of pinion gears 53 may be supported by two pinion shafts 52.

The reduction gear mechanism 4 is composed of a first gear pair 41 and a second gear pair 42. The first gear pair 41 includes a pinion gear 411 that is a first gear and a large diameter gear 412 that is a second gear. The pinion gear 411 and the large diameter gear 412 mesh with each other. The second gear pair 42 includes a small diameter gear 421 that is a third gear and a ring gear 422 that is a fourth gear. The small diameter gear 421 and the ring gear 422 mesh with each other.

The pinion gear 411 is coupled to an input shaft 61 such that the pinion gear 411 is not rotatable relative to the input shaft 61. The input shaft 61 is fixed to a shaft of the electric motor 3 that is a driving source. The large diameter gear 412 is coupled to an intermediate shaft 62 such that the large diameter gear 412 is not rotatable relative to the intermediate shaft 62. The intermediate shaft 62 is disposed parallel to the input shaft 61. The small diameter gear 421 is located next to the large diameter gear 412 in the direction of a rotation axis $O_2$ of the intermediate shaft 62, and is coupled to the intermediate shaft 62 such that the small diameter gear 421 is not rotatable relative to the intermediate shaft 62. The ring gear 422 is fixed to the differential case 51.

The control device 9 has a switching element that switches a DC power supply such as a battery mounted on the four-wheel drive vehicle 1 to output DC power to the electric motor 3. The control device 9 controls the current that is supplied to the electric motor 3 by pulse width modulation (PWM) control. The electric motor 3 generates a driving force according to the current supplied from the control device 9.

Figure 2:
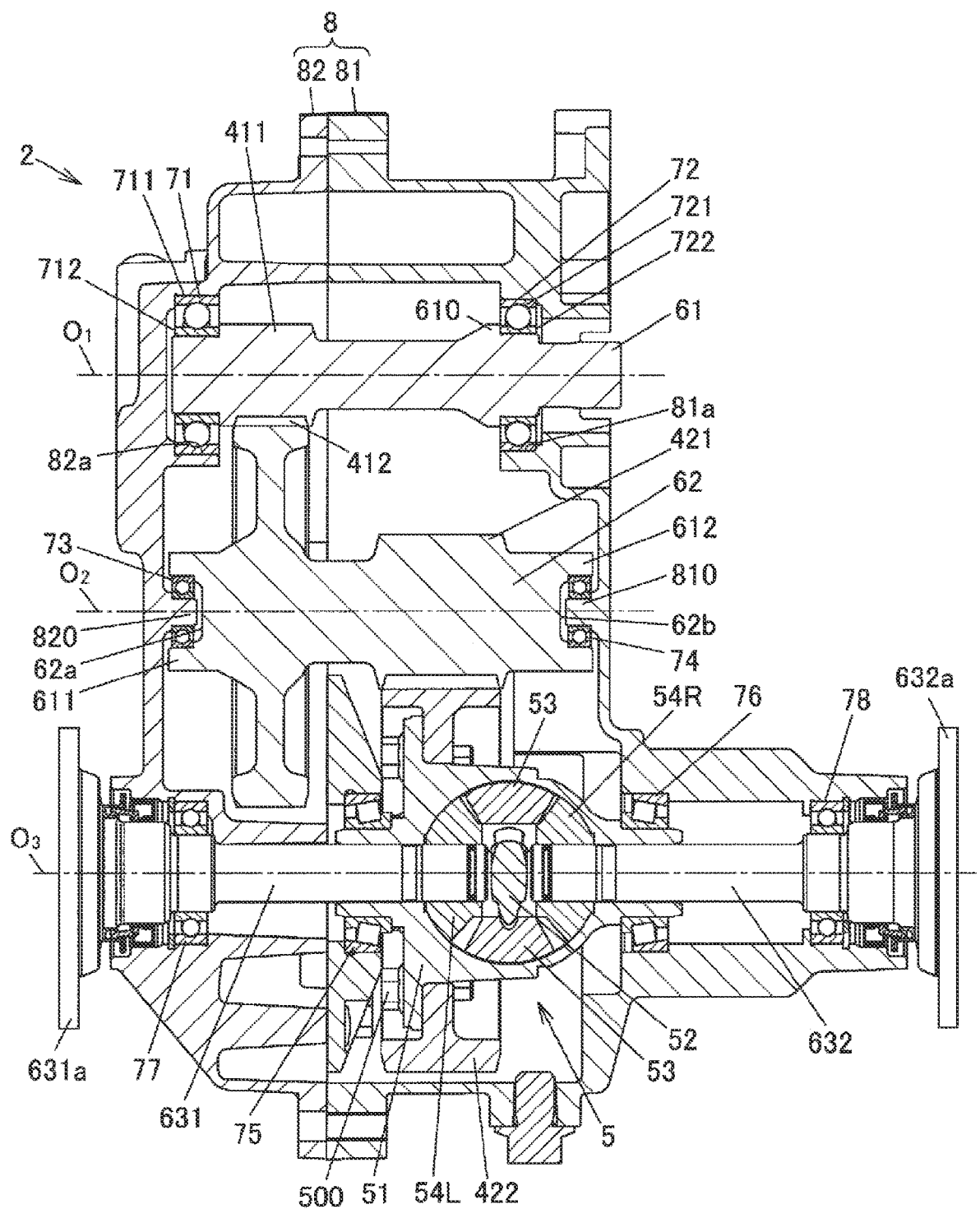
FIG. 2 is a sectional view illustrating a configuration example of the auxiliary drive device according to the embodiment.

FIG. 2 is a sectional view illustrating a configuration example of the auxiliary drive device 2. For convenience of illustration, the electric motor 3 and the control device 9 are not shown in FIG. 2.

As shown in FIG. 2, the auxiliary drive device 2 includes the input shaft 61, the intermediate shaft 62, first and second output shafts 631, 632, and a casing 8. The input shaft 61 receives the driving force of the electric motor 3 and rotates about a rotation axis $O_1$. The intermediate shaft 62 is disposed parallel to the input shaft 61 and rotates about the rotation axis $O_2$. The first and second output shafts 631, 632 are output shafts and rotate about a rotation axis $O_3$.

The casing 8 accommodates the input shaft 61, the intermediate shaft 62, the first and second output shafts 631, 632, and the differential unit 5. The casing 8 is composed of a case 81 and a cover 82 which are fixed together by bolts, not shown.

The input shaft 61 is integral with the pinion gear 411 and serves as a gear shaft of the pinion gear 411. A ball bearing 71 is disposed in a bearing fitting hole 82a formed in the cover 82, and a ball bearing 72 is disposed in a bearing fitting hole 81a formed in the case 81. The input shaft 61 is supported by the cover 82 via the ball bearing 71 so as to be rotatable with respect to the cover 82 and is supported by the case 81 via the ball bearing 72 so as to be rotatable with respect to the case 81.

An inner ring 712 of the ball bearing 71 is in contact with the pinion gear 411 in the direction of the rotation axis $O_1$ and is subjected to a thrust force that is generated with rotation of the input shaft 61. An outer ring 711 of the ball bearing 71 is fitted in the bearing fitting hole 82a of the cover 82.

An inner ring 722 of the ball bearing 72 is in contact with a large diameter portion 610 of the input shaft 61 in the direction of the rotation axis $O_1$ and is subjected to the thrust force that is generated with rotation of the input shaft 61. An outer ring 721 of the ball bearing 72 is fitted in the bearing fitting hole 81a of the case 81.

The intermediate shaft 62 is integral with the large diameter gear 412 and the small diameter gear 421. A ball bearing 73 is fitted on a boss portion 820 of the cover 82, and a ball bearing 74 is fitted on a boss portion 810 of the case 81. The intermediate shaft 62 is supported by the cover 82 via the ball bearing 73 so as to be rotatable with respect to the cover 82 and is supported by the case 81 via the ball bearing 74 so as to be rotatable with respect to the case 81.

FIGS. 3A and 3B are enlarged views of the ball bearings 73, 74 and portions around the ball bearings 73, 74, respectively. As shown in FIG. 3A, the ball bearing 73 is located in a first recessed portion 62a in the left axial end face of the intermediate shaft 62. An outer ring 731 of the ball bearing 73 is fitted in a protruding portion 611 in the left axial end of the intermediate shaft 62. An inner ring 732 of the ball bearing 73 is fitted on the boss portion 820 of the cover 82. The ball bearing 73 is thus disposed in the first recessed portion 62a of the intermediate shaft 62.

As shown in FIG. 3B, the ball bearing 74 is located in a second recessed portion 62b in the right axial end face of the intermediate shaft 62. An outer ring 741 of the ball bearing 74 is clearance-fitted in a protruding portion 612 in the right axial end of the intermediate shaft 62, and the clearance allows the intermediate shaft 62 to move in the direction of the rotation axis $O_2$. An inner ring 742 of the ball bearing 74 is fitted on the boss portion 810 of the case 81. The ball bearing 74 is thus disposed in the second recessed portion 62b of the intermediate shaft 62.

As shown in FIG. 2, the differential case 51 of the differential unit 5 is supported by the case 81 via tapered roller bearings 75, 76 so as to be rotatable with respect to the case 81. The differential case 51 and the ring gear 422 are fixed together by bolts 500.

The first output shaft 631 is coupled to the side gear 54L and is supported by the cover 82 via a ball bearing 77 so as to be rotatable with respect to the cover 82. The first output shaft 631 has a flange portion 631a at its left end in the direction of the rotation axis $O_3$, and the first output shaft 631 is also coupled to the drive shaft 18L via the flange portion 631a. The second output shaft 632 is coupled to the side gear 54R and is supported by the case 81 via a ball bearing 78 so as to be rotatable with respect to the case 81. The second output shaft 632 has a flange portion 632a at its right end in the direction of the rotation axis $O_3$, and the second output shaft 632 is also coupled to the drive shaft 18R via the flange portion 632a.

In the auxiliary drive device 2 configured as described above, rotation that is input from the electric motor 3 to the input shaft 61 is reduced in speed by the reduction gear mechanism 4 to increase the torque, and the increased torque is transferred to the drive shafts 18L, 18R via the first and second output shafts 631, 632.

Figure 4:
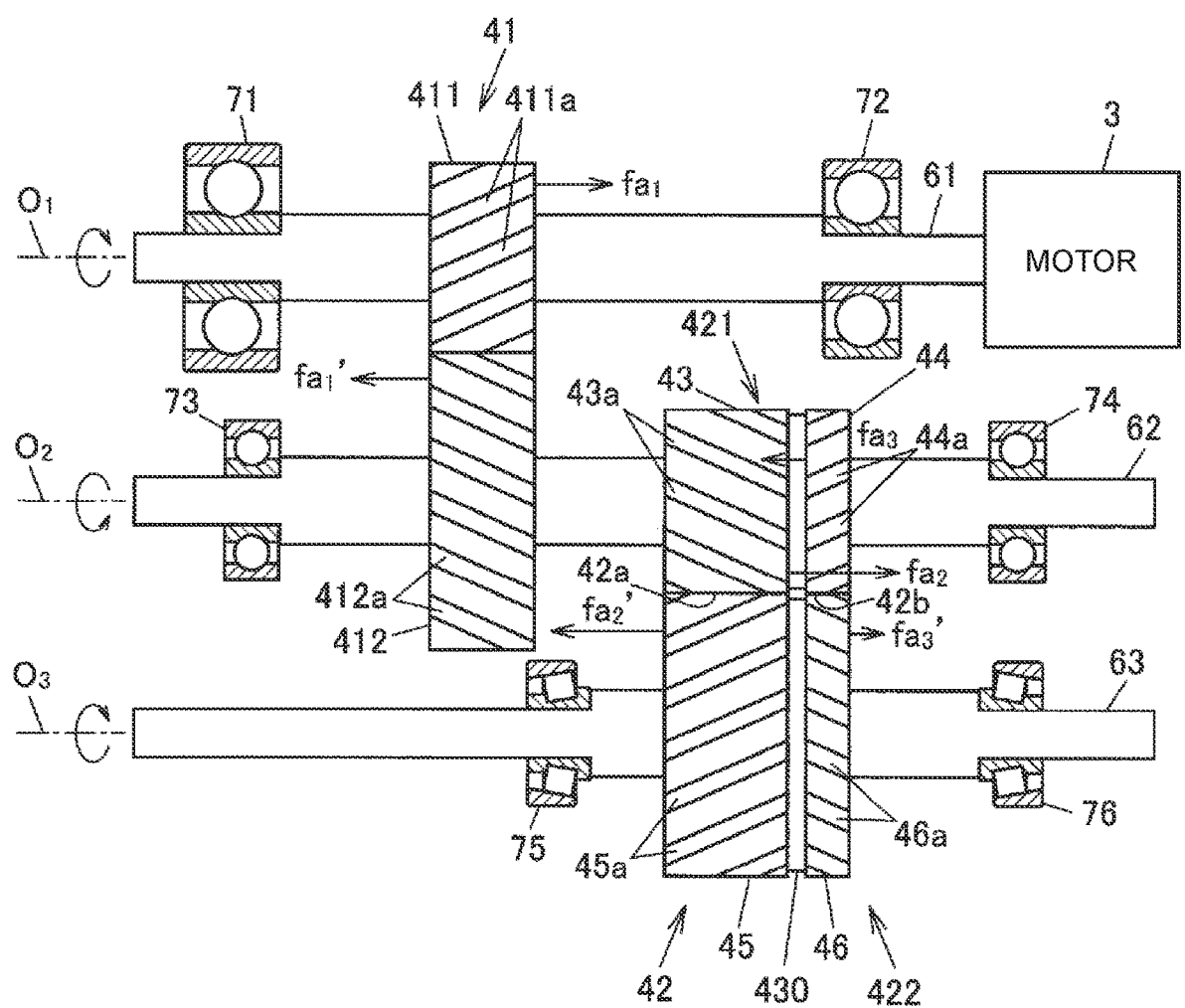
FIG. 4 schematically illustrates the configurations of a first gear pair and a second gear pair according to the embodiment.

FIG. 4 schematically illustrates the configurations of the first gear pair 41 and the second gear pair 42 according to the present embodiment. For clarity of illustration, the first and second output shafts 631, 632 are regarded as a single shaft and illustrated as an output shaft 63 in FIG. 4.

As shown in FIG. 4, the pinion gear 411 and the large diameter gear 412 of the first gear pair 41 are helical gears, and the small diameter gear 421 and the ring gear 422 of the second gear pair 42 are double helical gears.

The double helical gears of the second gear pair 42 have first and second meshing portions 42a, 42b where helical gears of opposite hands mesh with each other. The first and second meshing portions 42a, 42b are located next to each other in the direction of the rotation axis $O_2$. In the present embodiment, the length of the first gear pair 41 in the direction of the rotation axis $O_1$ is smaller than the length of the second gear pair 42 in the direction of the rotation axis $O_2$ according to the reduction ratio of the reduction gear mechanism 4.

The pinion gear 411 of the first gear pair 41 has meshing teeth 411a with their tooth traces inclined with respect to the direction of the rotation axis $O_1$. The large diameter gear 412 has meshing teeth 412a that mesh with the meshing teeth 411a of the pinion gear 411. The meshing teeth 411a of the pinion gear 411 and the meshing teeth 412a of the large diameter gear 412 have the same helix angle but opposite hands.

The small diameter gear 421 of the second gear pair 42 has first and second helical gear portions 43, 44 of opposite hands located next to each other in the direction of the rotation axis $O_2$. Similarly, the ring gear 422 of the second gear pair 42 has third and fourth helical gear portions 45, 46 of opposite hands located next to each other in the direction of the rotation axis $O_3$.

The first helical gear portion 43 of the small diameter gear 421 has meshing teeth 43a with their tooth traces inclined with respect to the direction of the rotation axis $O_2$. The second helical gear portion 44 of the small diameter gear 421 has meshing teeth 44a of the opposite hand to the meshing teeth 43a of the first helical gear portion 43.

The third helical gear portion 45 of the ring gear 422 has meshing teeth 45a with their tooth traces inclined with respect to the direction of the rotation axis $O_3$. The fourth helical gear portion 46 of the ring gear 422 has meshing teeth 46a of the opposite hand to the meshing teeth 45a of the third helical gear portion 45.

In the first gear pair 41 and the second gear pair 42 configured as described above, when the input shaft 61 is driven by the electric motor 3 and rotates about the rotation axis $O_1$, the intermediate shaft 62 rotates about the rotation axis $O_2$ in the opposite direction to that of the input shaft 61 due to the pinion gear 411 and the large diameter gear 412 of the first gear pair 41 meshing with each other. The output shaft 63 thus rotates about the rotation axis $O_3$ in the opposite direction to that of the intermediate shaft 62 due to the small diameter gear 421 and the ring gear 422 of the second gear pair 42 meshing with each other. The output of the electric motor 3 is thus reduced in speed, and the increased torque is transferred to the right and left rear wheels 16R, 16L via the output shaft 63.

At this time, the first and second gear pairs 41, 42 are subjected to thrust forces ($fa_1$, $fa_1'$, $fa_2$, $fa_2'$, $fa_3$, and $fa_3'$ shown in FIG. 4) generated by meshing reaction forces on the gears. These thrust forces will be described in detail with reference to FIGS. 5A, 5B, 6A, and 6B.

Figure 5A:
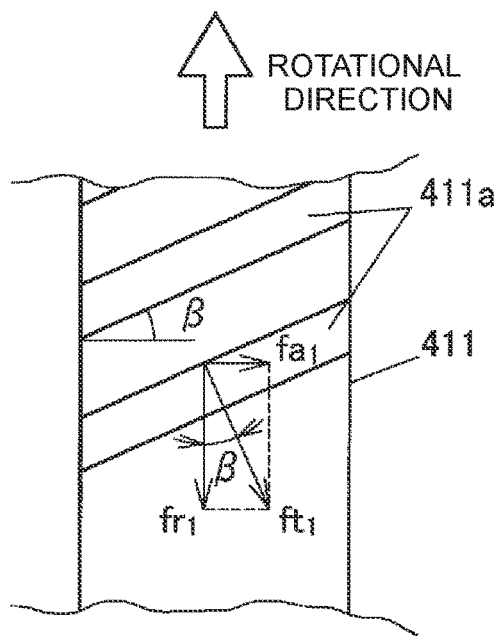
FIG. 5A schematically illustrates a thrust force that is generated on a pinion gear of the first gear pair, and FIG. 5B schematically illustrates a thrust force that is generated on a large diameter gear of the first gear pair.
Figure 5B:
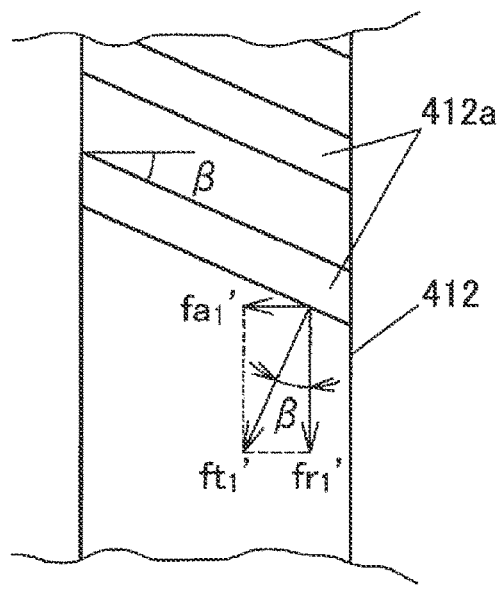
Figure 6A:
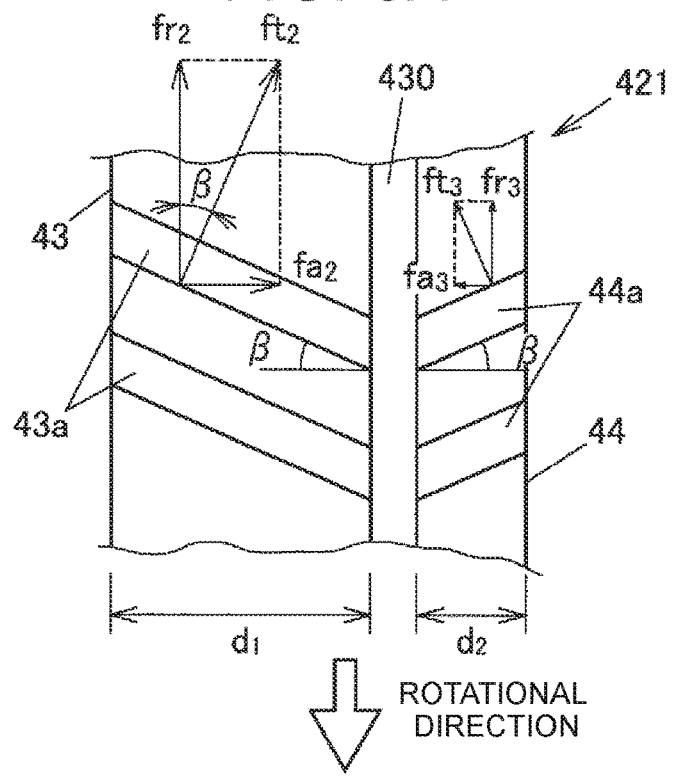
FIG. 6A schematically illustrates a thrust force that is generated on a small diameter gear of the second gear pair, and FIG. 6B schematically illustrates a thrust force that is generated on a ring gear of the second gear pair.
Figure 6B:
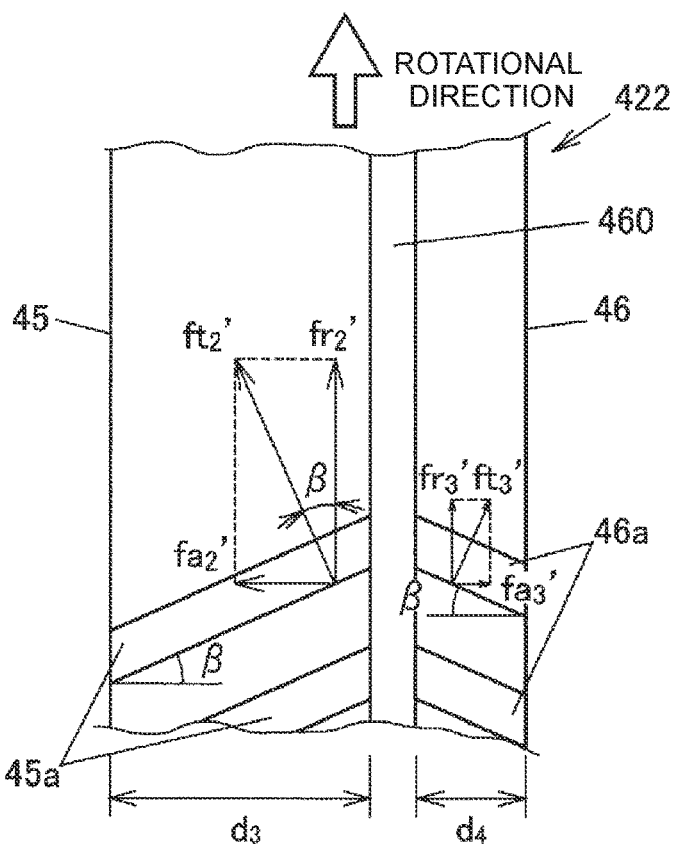

FIG. 5A schematically illustrates the meshing reaction force acting on the pinion gear 411 of the first gear pair 41, and FIG. 5B schematically illustrates the meshing reaction force acting on the large diameter gear 412 of the first gear pair 41. FIG. 6A schematically illustrates the meshing reaction force acting on the small diameter gear 421 of the second gear pair 42, and FIG. 6B schematically illustrates the meshing reaction force acting on the ring gear 422 of the second gear pair 42. The meshing teeth of all of the pinion gear 411, the large diameter gear 412, the small diameter gear 421, and the ring gear 422 have a helix angle of β.

As shown in FIG. 5A, a meshing reaction force $ft_1$ acts on the pinion gear 411 of the first gear pair 41 due to the pinion gear 411 meshing with the large diameter gear 412. The direction of the meshing reaction force flu is perpendicular to the tooth trace direction of the meshing teeth 411a of the pinion gear 411, and the meshing reaction force $ft_1$ acts in the opposite direction to the rotational direction of the input shaft 61. The thrust force $fa_1$, which is a component of the meshing reaction force $ft_1$ in the direction of the rotation axis $O_1$, and a torque transfer force $fr_1$, which is a component of the meshing reaction force $ft_1$ in the circumferential direction, thus act on the pinion gear 411.

As shown in FIG. 5B, a meshing reaction force $ft_1'$ acts on the large diameter gear 412 of the first gear pair 41 due to the large diameter gear 412 meshing with the pinion gear 411. The direction of the meshing reaction force $ft_1'$ is perpendicular to the tooth trace direction of the meshing teeth 412a of the large diameter gear 412, and the meshing reaction force $ft_1'$ acts in the rotational direction of the intermediate shaft 62. The thrust force $fa_1'$, which is a component of the meshing reaction force $ft_1'$ in the direction of the rotation axis $O_2$, and a torque transfer force $fr_1'$, which is a component of the meshing reaction force $ft_1'$ in the circumferential direction, thus act on the large diameter gear 412. The magnitude of the meshing reaction force $ft_1'$ on the large diameter gear 412 and the magnitude of the meshing reaction force $ft_1$ on the pinion gear 411 are the same ($ft_1 = ft_1'$).

As shown in FIG. 6A, a meshing reaction force $ft_2$ acts on the first helical gear portion 43 of the small diameter gear 421 of the second gear pair 42 due to the first helical gear portion 43 meshing with the third helical gear portion 45 of the ring gear 422. The direction of the meshing reaction force $ft_2$ is perpendicular to the tooth trace direction of the meshing teeth 43a of the first helical gear portion 43, and the meshing reaction force $ft_2$ acts in the opposite direction to the rotational direction of the intermediate shaft 62. The thrust force fat, which is a component of the meshing reaction force $ft_2$ in the direction of the rotation axis $O_2$, and a torque transfer force $fr_2$, which is a component of the meshing reaction force $ft_2$ in the circumferential direction, thus act on the first helical gear portion 43.

A meshing reaction force $ft_3$ acts on the second helical gear portion 44 of the small diameter gear 421 of the second gear pair 42 due to the second helical gear portion 44 meshing with the fourth helical gear portion 46 of the ring gear 422. The direction of the meshing reaction force $ft_3$ is perpendicular to the tooth trace direction of the meshing teeth 44a of the second helical gear portion 44, and the meshing reaction force $ft_3$ acts in the opposite direction to the rotational direction of the intermediate shaft 62. The thrust force $fa_3$, which is a component of the meshing reaction force $ft_3$ in the direction of the rotation axis $O_2$, and a torque transfer force $fr_3$, which is a component of the meshing reaction force $ft_3$ in the circumferential direction, thus act on the second helical gear portion 44.

In the present embodiment, the length $d_1$ of the first helical gear portion 43 in the direction of the rotation axis $O_2$ is larger than the length $d_2$ of the second helical gear portion 44 in the direction of the rotation axis $O_2$ ($d_1 > d_2$). The thrust forces generated on the first helical gear portion 43 and the second helical gear portion 44 are therefore not equal.

There is predetermined clearance 430 between the first helical gear portion 43 and the second helical gear portion 44. This clearance 430, which is, e.g., 2 mm to 3 mm, is clearance for skiving teeth during skiving.

As shown in FIG. 6B, a meshing reaction force $ft_2'$ acts on the third helical gear portion 45 of the ring gear 422 of the second gear pair 42 due to the third helical gear portion 45 meshing with the first helical gear portion 43 of the small diameter gear 421. The direction of the meshing reaction force $ft_2'$ is perpendicular to the tooth trace direction of the meshing teeth 45a of the third helical gear portion 45, and the meshing reaction force $ft_2'$ acts in the rotational direction of the output shaft 63. The thrust force $fa_2'$, which is a component of the meshing reaction force $ft_2'$ in the direction of the rotation axis $O_3$, and a torque transfer force $fr_2'$, which is a component of the meshing reaction force $ft_2'$ in the circumferential direction, thus act on the third helical gear portion 45.

A meshing reaction force $ft_3'$ acts on the fourth helical gear portion 46 of the ring gear 422 of the second gear pair 42 due to the fourth helical gear portion 46 meshing with the second helical gear portion 44 of the small diameter gear 421. The direction of the meshing reaction force $ft_3'$ is perpendicular to the tooth trace direction of the meshing teeth 46a of the fourth helical gear portion 46, and the meshing reaction force $ft_3'$ acts in the rotational direction of the output shaft 63. The thrust force $fa_3'$, which is a component of the meshing reaction force $ft_3'$ in the direction of the rotation axis $O_3$, and a torque transfer force $fr_3'$, which is a component of the meshing reaction force $ft_3'$ in the circumferential direction, thus act on the fourth helical gear portion 46.

In the present embodiment, like the first and second helical gear portions 43, 44 described with reference to FIG. 6A, the length $d_3$ of the third helical gear portion 45 in the direction of the rotation axis $O_3$ is larger than the length $d_4$ of the fourth helical gear portion 46 in the direction of the rotation axis $O_3$ ($d_3 > d_4$). The thrust forces generated on the third helical gear portion 45 and the fourth helical gear portion 46 are therefore not equal.

In the present embodiment, the thrust forces generated on the large diameter gear 412 of the first gear pair 41 and the small diameter gear 421 of the second gear pair 42 cancel each other out. The thrust force on the intermediate shaft 62 is thus reduced.

More specifically, in the small diameter gear 421 of the second gear pair 42, the thrust force $fa_2$ acting on the intermediate shaft 62 due to the meshing reaction force $ft_2$ on the first meshing portion 42a of the second gear pair 42 and the thrust force $fa_3$ acting on the intermediate shaft 62 due to the meshing reaction force $ft_3$ on the second meshing portion 42b are generated in such directions that the thrust forces $fa_2$, $fa_3$ cancel each other. The residual thrust force ($fa_2 - fa_3$) remaining after the cancellation of the thrust forces $fa_2$, $fa_3$ cancels out the thrust force $fa_1'$ on the large diameter gear 412 of the first gear pair 41. The thrust force $fa_2$ on the first helical gear portion 43 corresponds to the first thrust force, and the thrust force $fa_3$ on the second helical gear portion 44 corresponds to the second thrust force.

Since the length $d_2$ of the second helical gear portion 44 in the direction of the rotation axis $O_2$ is smaller than the length $d_1$ of the first helical gear portion 43 in the direction of the rotation axis $O_2$, the thrust force $fa_3$ on the second helical gear portion 44 is smaller than the thrust force $fa_2$ on the first helical gear portion 43 ($fa_3 < fa_2$). The residual thrust force ($fa_2 - fa_3$) is therefore generated in the opposite direction to that of the thrust force $fa_1'$ of the large diameter gear 412 of the first gear pair 41, and the residual thrust force ($fa_2 - fa_3$) and the thrust force $fa_1'$ cancel each other out.

In the present embodiment, since the magnitude of the residual thrust force ($fa_2 - fa_3$) generated on the small diameter gear 421 and the magnitude of the thrust force $fa_1'$ generated on the large diameter gear 412 are the same, these thrust forces completely cancel each other out on the intermediate shaft 62. The thrust force acting on the intermediate shaft 62 is thus reduced, and the load on the ball bearings 73, 74 that are subjected to the thrust force on the intermediate shaft 62 is reduced.

As described above, in the present embodiment, in the second gear pair 42 composed of double helical gears, the length of the first meshing portion 42a in the direction of the rotation axis and the length of the second meshing portion 42b in the direction of the rotation axis are different from each other, and the residual thrust force ($fa_2 - fa_3$) on the small diameter gear 421 of the second gear pair 42 and the thrust force far on the large diameter gear 412 of the first gear pair 41 cancel each other out. The thrust force acting on the intermediate shaft 62 is thus reduced.

Comparative Example

Figure 7:
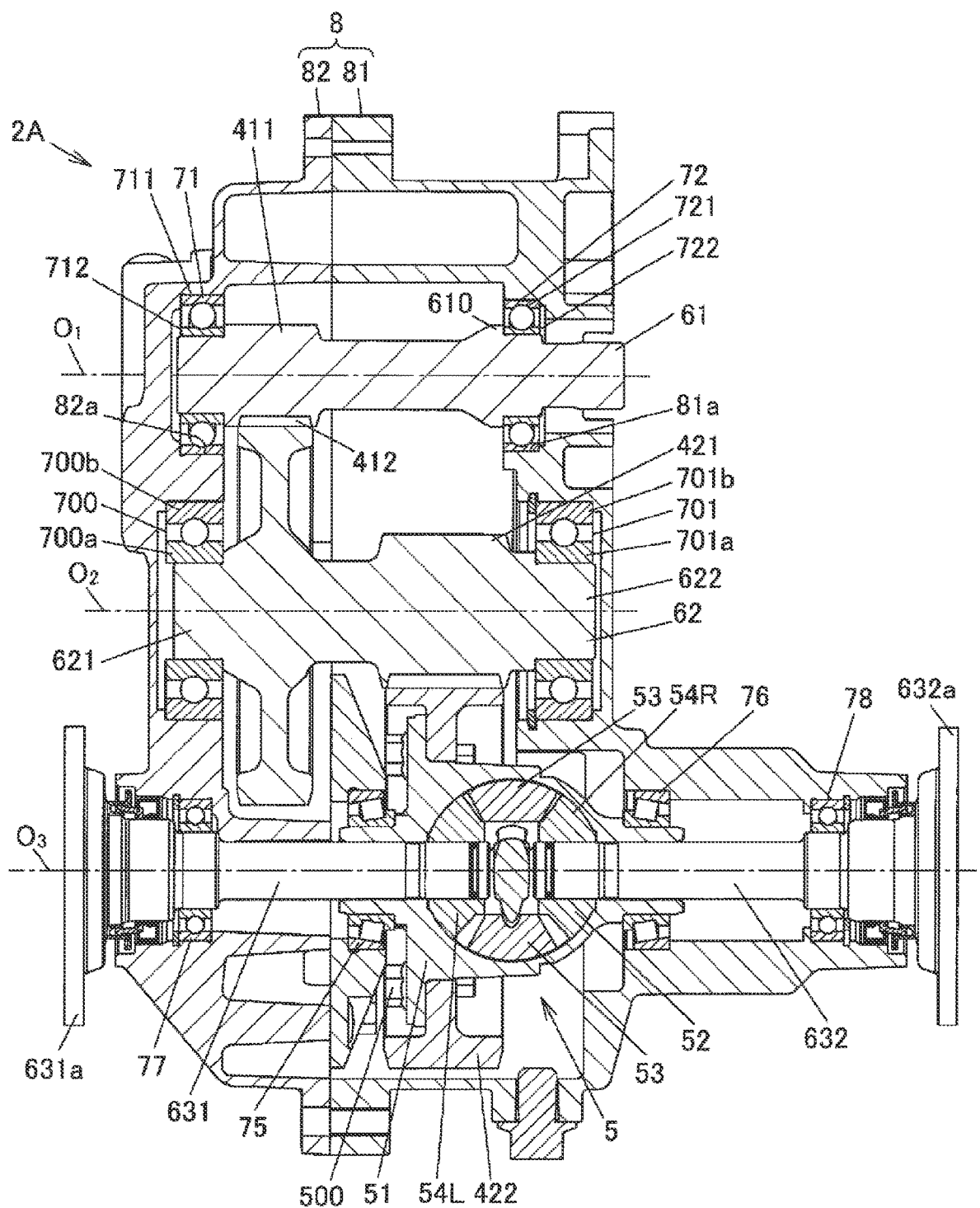
FIG. 7 is a sectional view illustrating a configuration example of an auxiliary drive device according to a comparative example.
Figure 8:
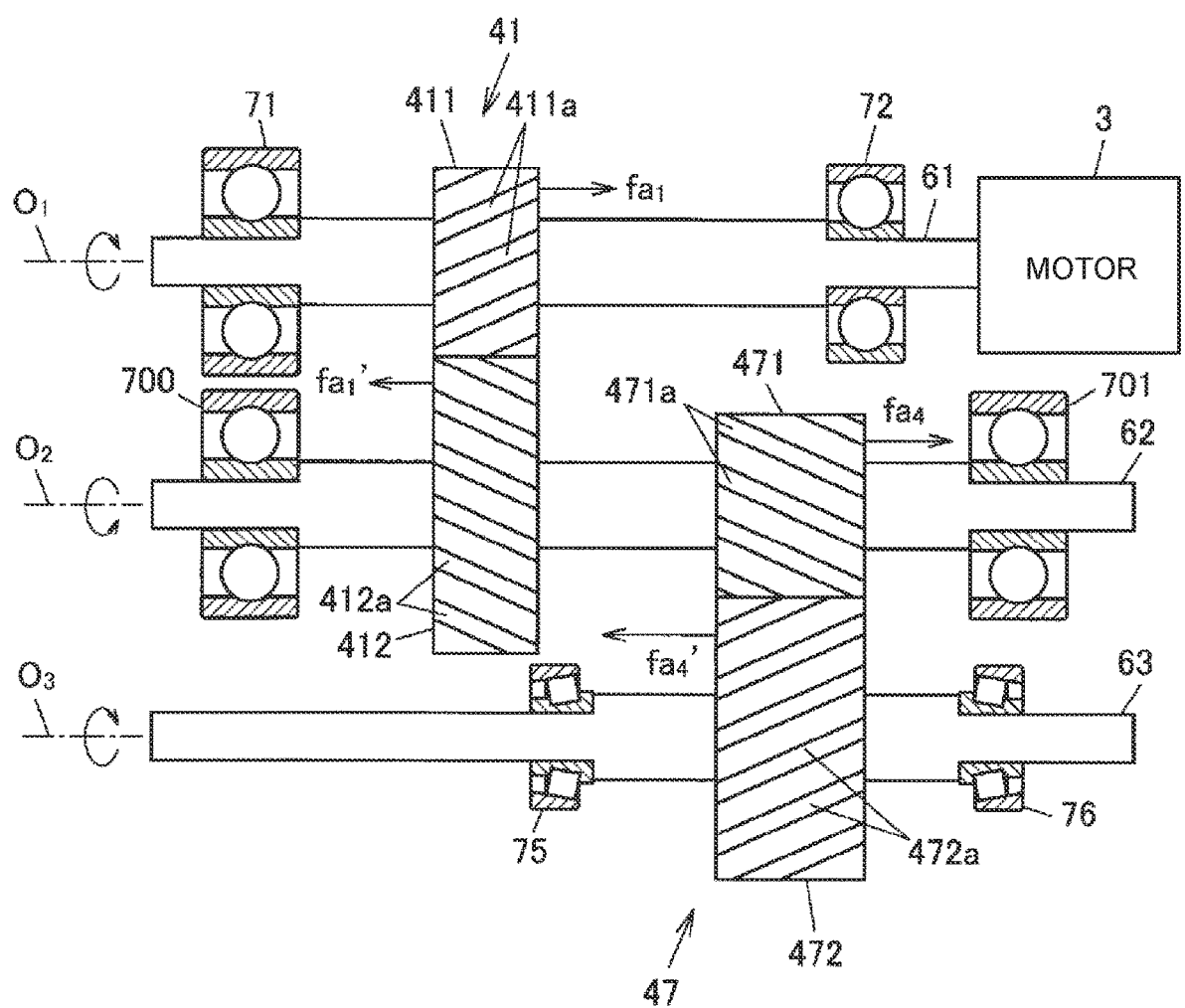
FIG. 8 schematically illustrates the configurations of a first gear pair and a second gear pair according to the comparative example.

Next, an auxiliary drive device 2A according to a comparative example will be described with reference to FIGS. 7 and 8. FIG. 7 is a sectional view illustrating a configuration example of the auxiliary drive device 2A according to the comparative example. FIG. 8 schematically illustrates the configurations of the first gear pair 41 and a second gear pair 47. In the description of the comparative example, the same portions as those of the embodiment are denoted with the same signs, and description thereof will be omitted.

The auxiliary drive device 2A according to the comparative example is different from the auxiliary drive device 2 according to the embodiment in that the second gear pair 47 is composed of helical gears. That is, in the auxiliary drive device 2A according to the comparative example, both the first and second gear pairs 41, 47 are composed of helical gears.

As shown in FIG. 7, the intermediate shaft 62 of the auxiliary drive device 2A according to the comparative example has a first boss portion 621 in its left axial end and has a second boss portion 622 in its right axial end. The first boss portion 621 is fitted in an inner ring 700a of a ball bearing 700, and the second boss portion 622 is fitted in an inner ring 701a of a ball bearing 701. The ball bearing 700 supports the intermediate shaft 62 in the cover 82 such that intermediate shaft 62 is rotatable with respect to the cover 82, and the ball bearing 701 supports the intermediate shaft 62 in the case 81 such that the intermediate shaft 62 is rotatable with respect to the case 81.

In the auxiliary drive device 2A according to the comparative example, the ball bearings 700, 701 supporting the intermediate shaft 62 are disposed radially outside the axial ends of the intermediate shaft 62. The auxiliary drive device 2A is configured in this manner because the ball bearings 700, 701 of the comparative example are larger than the ball bearings 73, 74 of the embodiment. The use of these large ball bearings 700, 701 is a bottleneck for reduction in overall size of the auxiliary drive device 2A.

Since the ball bearings 73, 74 of the embodiment are smaller than the ball bearings 700, 701 of the comparative example, the ball bearings 73, 74 can be disposed in the first and second recessed portions 62a, 62b in both axial ends of the intermediate shaft 62. The configuration of the embodiment thus achieves reduction in overall device size.

As shown in FIG. 8, the second gear pair 47 of the comparative example is composed of single helical gears. The second gear pair 47 includes a small diameter gear 471 that rotates with the intermediate shaft 62 and a ring gear 472 that rotates with the output shaft 63. Meshing teeth 471a of the small diameter gear 471 and meshing teeth 472a of the ring gear 472 have the same helix angle but opposite hands. The length of the second gear pair 47 in the direction of the rotation axis is larger than the length of the first gear pair 41 in the direction of the rotation axis.

With operation of the electric motor 3, the small diameter gear 471 is subjected to a thrust force $fa_4$ generated on the meshing portion with the ring gear 472, and the ring gear 472 is subjected to a thrust force $fa_4'$ in the opposite direction to that of the thrust force $fa_4$ on the small diameter gear 471.

Since the length of the second gear pair 47 in the direction of the rotation axis is larger than the length of the first gear pair 41 in the direction of the rotation axis, the thrust force $fa_4$ on the small diameter gear 471 is larger than the thrust force $fa_1'$ on the large diameter gear 412 of the first gear pair 41. Accordingly, the thrust force $fa_4$ on the small diameter gear 471 and the thrust force $fa_1'$ on the large diameter gear 412 of the first gear pair 41 cancel each other, and the residual thrust force ($fa_4$–$fa_1'$) remaining after the cancellation of the thrust forces $fa_4$, $fa_1'$ acts on the intermediate shaft 62.

Since the ball bearing 701 is subjected to this residual thrust force ($fa_4$–$fa_1'$), the large ball bearing 701 is used so that it can withstand this load. When the electric motor 3 rotates in the reverse direction (when the four-wheel drive vehicle 1 moves backward), the direction of the thrust force on each gear becomes opposite, and the ball bearing 700 is subjected to the residual thrust force. The large bearings 700, 701 are therefore used to support the intermediate shaft 62 such that the intermediate shaft 62 is rotatable.

In the present embodiment, on the other hand, the thrust force on the intermediate shaft 62 is reduced. The small bearings 73, 74 are therefore used to support the intermediate shaft 62 such that the intermediate shaft 62 is rotatable. The bearings 73, 74 are disposed within the range of the axial length of the intermediate shaft 62. This configuration achieves reduction in overall device size and weight.

According to the embodiment described above, the bearings 73, 74 that support the intermediate shaft 62 are reduced in size by reducing the thrust force that acts on the intermediate shaft 62. This configuration achieves reduction in overall device size and weight.

According to the embodiment, the first gear pair 41 is composed of helical gears. This configuration achieves reduction in manufacturing cost as compared to the case where the case where both of the two gear pairs are composed of double helical gears.

Supplemental Note

Although the disclosure is described above based on the embodiment, the embodiment is not intended to limit the disclosure as defined in the claims. It should be noted that not all combinations of the features described in the embodiment are essential to solve the problem.

In the above embodiment, the first helical gear portion 43 and the second helical gear portion 44 have different lengths in the direction of the rotation axis so as to generate the residual thrust force that cancels out the thrust force $fa_1$ on the large diameter gear 412 of the first gear pair 41. However, the way to generate the residual thrust force is not limited to this.

For example, the helix angles of the gears in the first and second meshing portions 42a, 42b of the second gear pair 42 may be adjusted so as to generate the residual thrust force. More specifically, the first helical gear portion 43 and the second helical gear portion 44 of the second gear pair 42 may have the same length in the direction of the rotational axis but different helix angles. With this configuration as well, the thrust forces on the first and second helical gear portions 43, 44 are not equal, and the residual thrust force is therefore generated. In this case, the third and fourth helical gear portions 45, 46 can be made to have the same length in the direction of the rotation axis. The thrust forces on the third and fourth helical gear portions 45, 46 therefore cancel each other out so that no thrust force acts on the first and second output shafts 631, 632. This configuration reduces the thrust forces on the first and second output shafts 631, 632 that transfer large torque.

In the above embodiment, the first gear pair 41 is composed of helical gears. However, the disclosure is not limited to this, and the first gear pair 41 may be composed of spur gears having a helix angle of zero degrees. Alternatively, the first gear pair 41 may be composed of double helical gears and the second gear pair 42 may be composed of spur gears.

In the above embodiment, the configurations of the first and second gear pairs 41, 42 are provided in a drive system on the rear wheel side of the four-wheel drive vehicle 1. However, the disclosure is not limited to this, and the configurations of the first and second gear pairs 41, 42 may be provided in a drive system on the front wheel side of the four-wheel drive vehicle 1.

What is claimed is:
1. A vehicle drive device comprising:
an input shaft that receives a driving force of a driving source and that is provided with a first gear;
an intermediate shaft that is provided with a second gear meshing with the first gear and a third gear located next to the second gear in a direction of a rotation axis, and that is disposed in such a manner that the intermediate shaft is allowed to move in the direction of the rotation axis;

an output shaft that is provided with a fourth gear meshing with the third gear;

a first gear pair including the first gear and the second gear; and a second gear pair including the third gear and the fourth gear, wherein one of the first gear pair and the second gear pair includes a helical gear, the other of the first gear pair and the second gear pair includes a double helical gear, the double helical gear includes a first meshing portion and a second meshing portion that are located next to each other in the direction of the rotation axis of the intermediate shaft and that have meshing teeth of different hands, a meshing reaction force on the first meshing portion includes a first thrust force that acts on the intermediate shaft in a first direction, a meshing reaction force on the second meshing portion includes a second thrust force that acts on the intermediate shaft in a second direction opposite to the first direction, a residual thrust force remaining after cancellation of the first thrust force and the second thrust force in the double helical gear acts on the intermediate shaft in a third direction, a meshing reaction force on a meshing portion in the one gear pair includes a third thrust force that acts on the intermediate shaft in a fourth direction opposite to the third direction, and the residual thrust force is based on the first meshing portion and the second meshing portion of the double helical gear having different lengths in the direction of the rotation axis.

2. The vehicle drive device according to claim 1, wherein the residual thrust force is based on a helix angle of the gear in the first meshing portion being different from a helix angle of the gear in the second meshing portion.

3. The vehicle drive device according to claim 1, wherein the second gear pair includes the double helical gear.

* * * * *